(12) United States Patent
Fernald

(10) Patent No.: US 7,284,106 B1
(45) Date of Patent: Oct. 16, 2007

(54) METHOD AND APPARATUS FOR PROTECTING INTERNAL MEMORY FROM EXTERNAL ACCESS

(75) Inventor: Ken Fernald, Austin, TX (US)

(73) Assignee: Silicon Labs CP, Inc., Austin, TX (US)

( * ) Notice: Subject to any disclaimer, the term of this patent is extended or adjusted under 35 U.S.C. 154(b) by 215 days.

(21) Appl. No.: 09/901,918

(22) Filed: Jul. 9, 2001

Related U.S. Application Data

(63) Continuation-in-part of application No. 09/479,551, filed on Jan. 7, 2000, now Pat. No. 6,615,324.

(51) Int. Cl.
*G06F 12/00* (2006.01)
*G06F 13/00* (2006.01)

(52) U.S. Cl. .................. 711/163; 711/100; 711/103; 711/154

(58) Field of Classification Search ............... 711/163, 711/100, 154, 103
See application file for complete search history.

(56) References Cited

U.S. PATENT DOCUMENTS

| | | | |
|---|---|---|---|
| 3,573,855 A | 4/1971 | Cragon | |
| 3,742,458 A | 6/1973 | Inoue et al. | |
| 4,975,878 A | 12/1990 | Boddu et al. | |
| 5,321,825 A * | 6/1994 | Song ......................... | 711/163 |
| 5,432,950 A | 7/1995 | Sibigtroth | |
| 5,442,704 A * | 8/1995 | Holtey ....................... | 711/163 |
| 5,452,431 A | 9/1995 | Bournas | |
| 5,600,818 A | 2/1997 | Weikmann | |
| 5,615,381 A | 3/1997 | Iijima | |
| 5,657,444 A | 8/1997 | Hall et al. | |
| 5,809,544 A | 9/1998 | Dorsey et al. | |
| 5,844,843 A | 12/1998 | Matsubara et al. | |
| 5,848,435 A | 12/1998 | Brant et al. | |
| 5,991,858 A | 11/1999 | Weinlander | |
| 6,101,586 A | 8/2000 | Ishimoto et al. | |
| 6,615,324 B1 * | 9/2003 | Fernald ....................... | 711/153 |
| 6,633,964 B2 * | 10/2003 | Zimmer et al. ............. | 711/163 |
| 6,636,906 B1 * | 10/2003 | Sharma et al. .............. | 710/22 |
| 6,681,300 B2 * | 1/2004 | Wolrich et al. ............. | 711/152 |

* cited by examiner

*Primary Examiner*—Tuan V. Thai
(74) *Attorney, Agent, or Firm*—Howison & Arnott, L.L.P.

(57) ABSTRACT

Method and apparatus for protecting internal memory from external access. A method for protecting a memory space from external access is provided. A plurality of lock bits are stored in a location in memory, each associated with a separate logical portion of the memory space and determinative as to the access thereof for a predetermined operation thereon. a request is then detected for access to a location in the memory space for operating thereon. The requested operation is then compared with the associated lock bit in the associated logical portion and then it is determined if access is allowed for the requested operation. If allowed, the requested operation is performed.

12 Claims, 6 Drawing Sheets

METHOD AND APPARATUS FOR
PROTECTING INTERNAL MEMORY FROM
EXTERNAL ACCESS

CROSS REFERENCE TO RELATED
APPLICATIONS

The present application is a Continuation-in-Part of U.S. patent application Ser. No. 09/479,551, filed Jan. 7, 2000 now U.S. Pat. No. 6,615,324, entitled EMBEDDED MICROPROCESSOR MULTI-LEVEL SECURITY SYSTEM IN FLASH MEMORY.

TECHNICAL FIELD OF THE INVENTION

This invention pertains in general to memory systems and, more particularly, to a data protected memory system.

BACKGROUND OF THE INVENTION

Currently available Memory systems are typically interfaced with a microprocessor core, which microprocessor core is operable to access any and all locations in the memory by generating an appropriate address. The processor requires access to the memory in order to both execute instructions and also read data from an address location or write data thereto.

In some situations, certain instructions are proprietary in nature and it is the desire of a manufacturer to protect that code. It is not the execution of the code that is to be protected but, rather, the ability of a user to gain access to the code, i.e., download the code, for reverse engineering thereof to determine the functionality that is embedded within the code. In systems that have provided this protected memory to prevent access to data or programs stored in the memory, circuitry is provided for monitoring the contents of the Program Counter and generating an inhibit signal whenever the Program Counter is at a certain value. This inhibit signal inhibits access to certain portions of the memory.

Additionally, protection of the memory is also important to the "lock" the memory from external access. This has typically been facilitated by generating lock bits in predetermined locations. Once these lock bits are set, the hardware will check a lock bit prior to allowing access to a particular section of memory. If a lock bit for that memory is set, then access to the memory for a read or write, depending upon which function is locked, will be prohibited. In order to reset the lock bit, the entire memory has to be erased.

SUMMARY OF THE INVENTION

The invention disclosed and claimed herein comprises, in one aspect thereof, a method for protecting a memory space from external access. A plurality of lock bits are stored in a location in memory, each associated with a separate logical portion of the memory space and determinative as to the access thereof for a predetermined operation thereon. a request is then detected for access to a location in the memory space for operating thereon. The requested operation is then compared with the associated lock bit in the associated logical portion and then it is determined if access is allowed for the requested operation. If allowed, the requested operation is performed.

BRIEF DESCRIPTION OF THE DRAWINGS

For a more complete understanding of the present invention and the advantages thereof, reference is now made to the following description taken in conjunction with the accompanying Drawings in which.

Responsive

DETAILED DESCRIPTION OF THE
INVENTION

Figure 1:
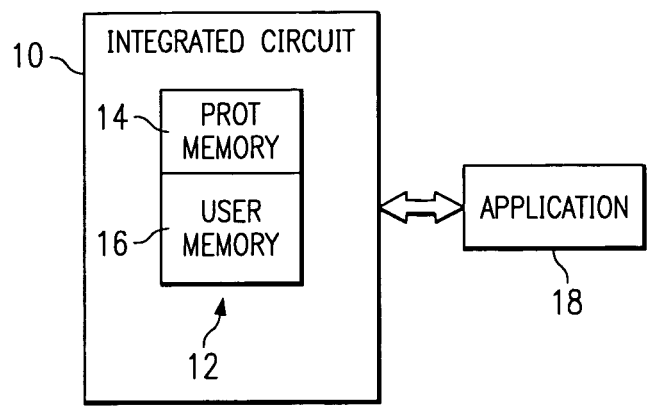
FIG. 1 illustrates a block diagram of the overall system associated with the present disclosed embodiment.

Referring now to FIG. 1, there is illustrated a top level diagram of a system utilizing the protected memory of the present disclosure. An integrated circuit 10 is provided which has disposed therein a protected memory 12. The protected memory 12 has associated therewith a protected memory region 14 and a user memory region 16. The integrated circuit 10 can be interfaced to any type of application 18 which can be any type of integrated circuit or board level device that interfaces with the integrated circuit 10. This integrated circuit 10 could be a part of a PC board which includes other integrated circuits or it could be a stand-alone integrated circuit that contains substantially all functionality needed to interface with the application 18. As will be described hereinbelow, the protected memory region 14 contains proprietary instructions that can be executed under the control of the user memory region 16. However, the user cannot, through program instructions stored in the user memory section 16, access information in the protected memory region 14 for retrieval therefrom for the purpose of viewing the instruction code or even the data stored in the protected memory region 14.

Figure 2:
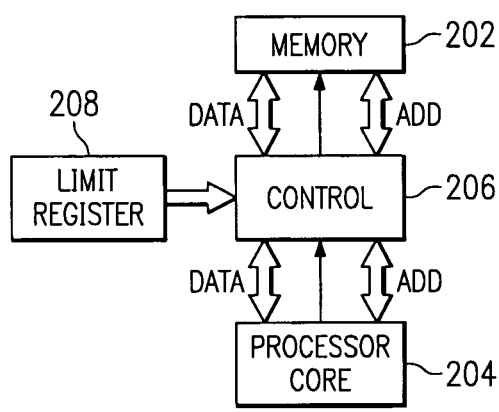
FIG. 2 illustrates a detailed diagram of the processor core and memory with the associated protected control logic.

Referring now to FIG. 2, there is illustrated a block diagram of the interface between a memory block 202 and a processor core 204. The processor core 204 contains general processing architecture and is operable to generate addresses, receive data, generate various control functions, etc. Typically, this will contain a Program Counter for substantially stepping through various instructions that are retrieved from the memory 202. A control logic block 206 is disposed between the processor core 204 and the memory 202, this having associated therewith the various logic function to achieve the protected memory function described hereinbelow. The control logic block 206 is operable to interpret addresses received from the processor core 204 and compare them with information stored in a limit register 208. This limit register 208 is either mask programmed or it is electronically programmed as a Write-Once, Read-Many (WORM) memory that allows a limit to be input to the integrated circuit 10, which limit defines the boundary between the protected memory region 14 and the user memory region 16. The control logic block 206, as will be described further hereinbelow, is operable to monitor the contents of the address bus and determine whether the contents of the address bus are directed toward the operation of fetching data or attempting to fetch an instruction code, i.e., whether the contents of the address bus constitute the contents of the Program Counter. With this information, the control logic block can then determine whether access is to be allowed to the memory 202. If not, some type of inhibit or other protected operation is undertaken.

Figure 3:
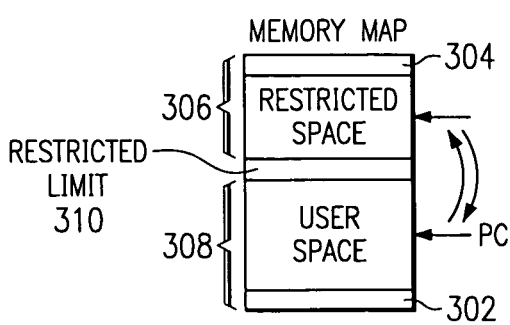
FIG. 3 illustrates a diagrammatic view of the memory map for the restricted space and user space.

Referring now to FIG. 3, there is illustrated a diagrammatic view of a memory map for the memory 202. The memory 202, as is conventional, is comprised of a plurality of memory locations which are accessible by generating an address. When the address is generated, a plurality of memory locations are accessed which typically constitute a "byte" of data, although any length is anticipated. For each address generated, one byte of data will be output. The memory map of FIG. 3 represents a sequence of byte locations from a lower byte location 302 to an upper byte location 304. The memory is divided into a restricted space and a user space, the restricted space comprising memory locations 306 and the user space comprising memory locations 308. There is one addressable memory location, memory location 310, which constitutes the boundary memory location. The address of this boundary location constitutes an address that is in the restricted space 306 and which address comprises the "limit" for the operation, as will be described in more detail hereinbelow.

The Program Counter (PC) is basically a pointer that defines an address for a particular instruction to be carried out. When this Program Counter address is generated, it is placed onto the address bus and the information at that address location extracted therefrom and routed to the processor core 204 for operations thereon. In the execution of the various instructions, the Program Counter may actually jump from the user space 308 up to the restricted space 306 to execute instructions therein. This is allowed in accordance with the embodiment herein to facilitate executing instructions in the restricted space 306 in response to a "call" instruction executed in the user space 308. However, as will be further described hereinbelow, instructions in the user space 308 cannot generate an address for the purpose of reading data from the restricted space 306 which would allow output of information stored in the restricted space from the system. The protective operation described herein is operable to prevent such an operation from occurring.

Figure 4:
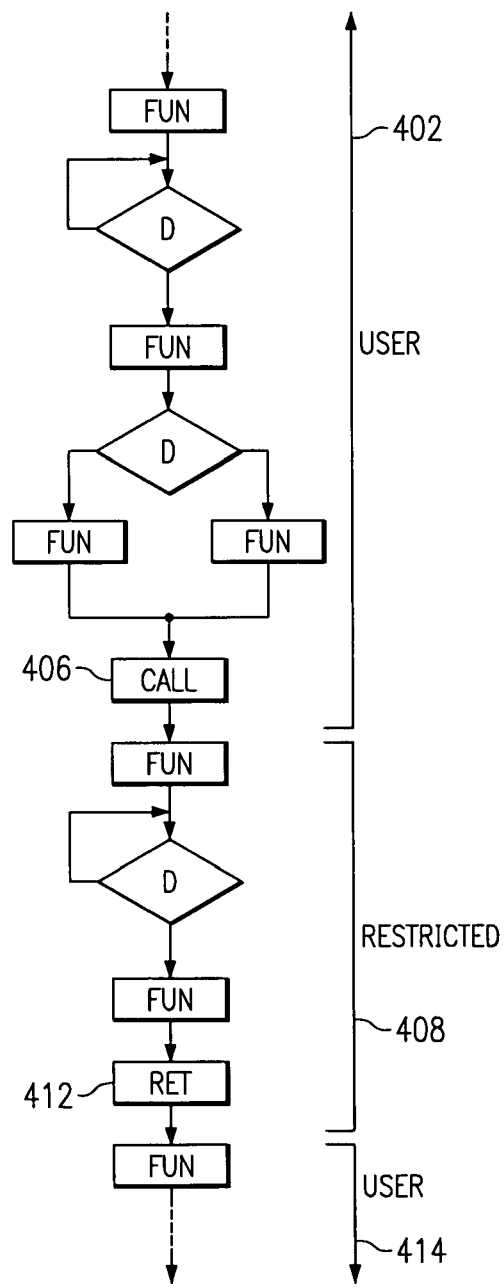
FIG. 4 illustrates an exemplary flowchart illustrating a processor between the user space and the restricted space.

Referring now to FIG. 4, there is illustrated an exemplary flowchart that depicts operation of the system wherein the instructions jump between the user space and the restricted space. In the first portion 402, the flowchart is executed along a flow path which has inserted therein a "Call" instruction in a block 406. At this instruction, the program is instructed to jump to the restricted space 306 by changing the value of the Program Counter (PC) and execute instructions therein in accordance with the new value of the PC. These blocks in the flowchart are a combination of various function blocks "Fun" and decision blocks "D." When the Call instruction is incurred at the block 406, the program will jump to the restricted space, represented by region 408. Of course, the Call instruction 406 must have associated therewith an Operand that has a Program Counter value associated with an addressable location within the restricted space 306. Once in the restricted space at the jumped-to location, the program will begin execution therefrom. This is represented by the various operational blocks in the program within the region 408. Once all the instructions have been executed in the restricted space associated with the jumped-to location, there will be an instruction at the end of the executable portion representing a return to the user space, indicated by a function block 412. This will then result in the Program Counter being returned back to the user space, typically at the next sequential Program Counter value as that associated with the Call instruction 406. The program will then continue in the user space, as represented by a portion 414 of the flowchart.

By executing instructions in the user portion 402 or the user portion 414 of the flowchart, the protective circuitry, as will be described hereinbelow, prohibits any instructions from accessing an addressable location within the restricted space 306 for reading of information therein or writing of information thereto. This is facilitated by examining the contents of the address bus and determining whether the contents of the address bus constitute an address for the purpose of reading or writing data or they 110 constitute a Program Counter value for the purpose of executing an instruction. If the program is operating in the user space and the information placed on the address bus is that of an address, as opposed to a Program Counter value, then the system is restricted. However, once the program is jumped over to the restricted space 408 through the incrementing of the Program Counter to an addressable location within the restricted space and placing of that Program Counter value on the address bus, then the operation will be transferred to the restricted space. Once in the restricted space, the program in the restricted space is capable of reading information from an addressable location anywhere in the memory and writing information thereto. This, of course, will be under the control of proprietary software and not under the control of user-generated software in the user space 308.

Figure 5:
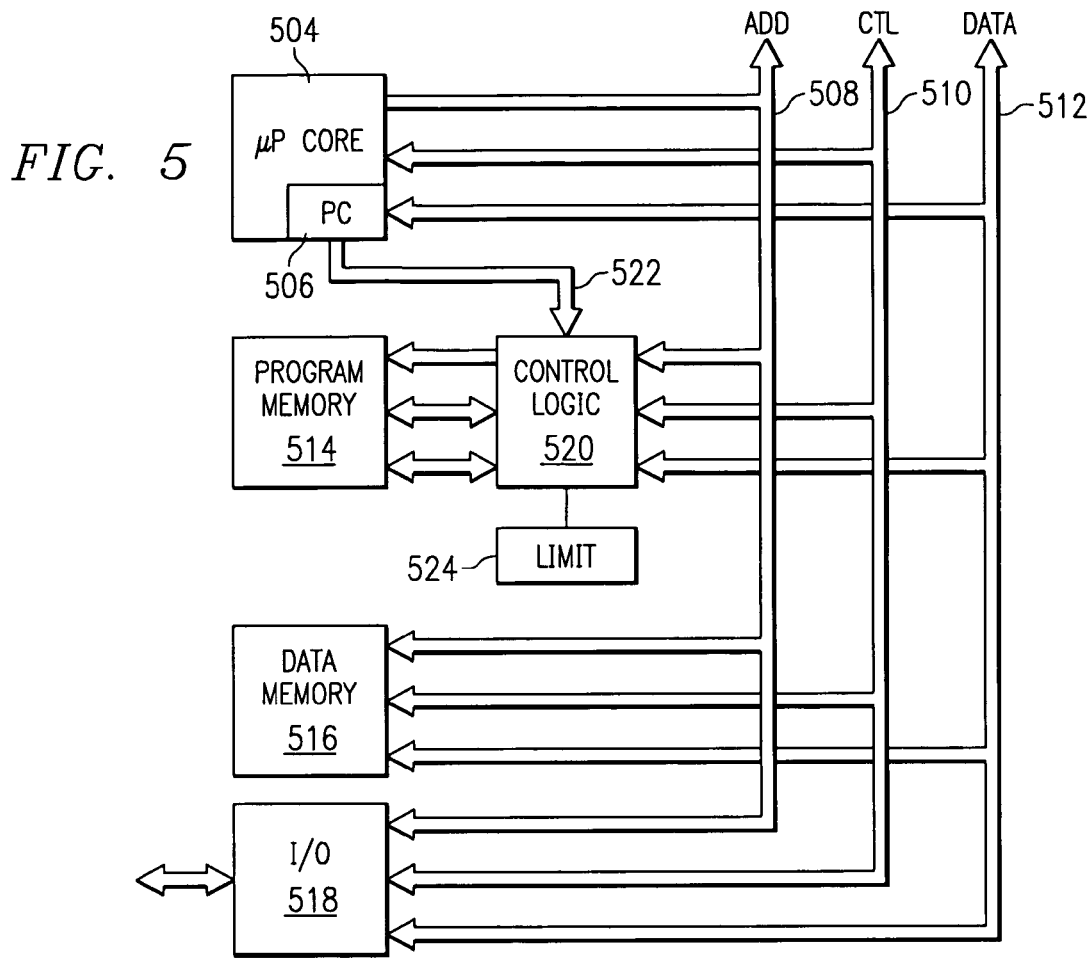
FIG. 5 illustrates a diagrammatic view of a system using the protected memory of the present disclosure.

Referring now to FIG. 5, there is illustrated a block diagram of an integrated circuit 10 incorporating the protected memory. A microprocessor core 504 is provided having a Program Counter 506 associated therewith. The microprocessor core 504 is interfaced with an address bus 508, a control bus 510 and a data bus 512. There is also provided a program memory 514, the protected memory in the system, and a data memory 516. The data memory 516 can be any type of memory, a volatile memory or a non-volatile memory, for storing readily accessible data in the such. There is also provided an input/output interface block 518 which is operable to interface external circuitry with the buses 508–512. The program memory 514 and the data memory 516 are also interfaced with the buses 508–512. However, the memory 514, the protected memory, is interfaced with the buses 508–512 through a control logic block 520. This control logic block 520 is operable to examine both the address information on the address bus 508 and also the information in the Program Counter (or information relating thereto), which is interfaced therewith, through a Program Counter bus 522. Of course, it should be understood that some of this control logic 520 could be incorporated into the microprocessor core 504 and merely the results of a comparison operation provided as a limited value output. The control logic block 520 is interfaced with a limit register 524, which is similar to the limit register 208 in that it contains information regarding the addressable location of the output between the restricted space 306 and the user space 308, this essentially being the address of the limit location 310. However, it should be understood that multiple limits could be provided within the restricted space providing different restricted spaces. It is merely noted that the control logic block 520 is operable to monitor the operation of the system and determine whether access to the memory 514 is to be allowed when this address is generated. This is based upon various considerations, as will be discussed hereinbelow.

The control logic block 520 is operable, when a determination is made that access is to be prohibited, to take one of a number of actions. One action could be to actually inhibit the address from being routed to the memory 14; one action could be to alter the address such that the desired location is not actually addressed, but the address is forced to the unrestricted space. Another action could be to inhibit output of data during that time or to output a preset data value such as an eight bit value of $00_h$. A further action is to inhibit the control circuitry feeding the memory. Each of these different alternatives will be described hereinbelow. However, it should be understood that any manner of preventing access to information within the memory, once it has been determined that access to the restricted space is to be denied, would be anticipated by the present disclosure.

In order to describe how the system operates with respect to the Program Counter and the contents of the address register which can selectively be placed on the address bus, reference is made to the following Table 1.

TABLE 1

|  | MEM | PC | BUS | BUS CONTENT |
| --- | --- | --- | --- | --- |
| (OPCODE) | MOVEC | $0001_h$ | $0001_h$ | PC Value |
| (OPERAND) | $CD_h$ | $0002_h$ | $0002_h$ | PC Value |
| (DATA) | $FC_h$ | xxxx | $00CD_h$ | ADDR-Allowed |
| . | . | . | . | . |
| . | . | . | . | . |
| . | . | . | . | . |
| (OPCODE) | LJMP | $00F1_h$ | $00F1_h$ | PC Value |
| (OPERAND) | $FE_h$ | $00F2_h$ | $00F2_h$ | PC Value |
| (OPERAND) | $FE_h$ | $00F3_h$ | $00F3_h$ | PC Value |
| (OPCODE) | PUSH | $FEFE_h$ | $FEFE_h$ | PC Value |
| . | . | . | . | . |
| . | . | . | . | . |
| . | . | . | . | . |
| (OPCODE) | MOVEC | $FEFE_h$ | $FEFE_h$ | PC Value |
| (OPERAND) | $FF_h$ | $FEFF_h$ | $FEFF_h$ | PC Value |
| (OPERAND) | $FF_h$ | $FF00_h$ | $FF00_h$ | PC Value |
| (DATA) | $C2_h$ | xxxx | $FFFF_h$ | ADDR-Allowed |
| . | . | . | . | . |
| . | . | . | . | . |
| . | . | . | . | . |
| (OPCODE) | MOVEC | $00FE_h$ | $00FE_h$ | PC Value |
| (OPERAND) | $FF_h$ | $FEFF_h$ | $C0FF_h$ | PC Value |
| (OPERAND) | $FF_h$ | $FEFF_h$ | $C000_h$ | PC Value |
| (DATA) | $C2_h$ | xxxx | $FFFF_h$ | ADDR-Not Allowed |

In Table 1, it can be seen that there is provided the content of the memory location being addressed, the value of the Program Counter, the value actually placed on the address bus and the contents of the address bus. In the first line, the Program Counter is initiated at a value of $0001_h$ representing the first instructions which are initiated at the first location in the memory. By example, this is a move command which is operable to control information to the access from the memory and move to a register, such an accumulator or another location. This is referred to as the command "MOVEC." This constitutes the Opcode. The second part of the instruction will be the Operand, which, in this instance, will be output when the Program Counter changes to $0002_h$. This results in the eight-bit value $CD_h$ being output on the address bus in the next operation. Therefore, for the first two steps, it can be seen that the Program Counter value can be placed onto the address bus for the purpose of addressing the memory. The eight-bit Operand $CD_h$ constitutes an operation wherein this eight-bit value is appended onto another value, in this example, an eight-bit value of $00_h$ to result in the overall address value of $00CD_h$. At this point in time, the address bus value is an address value that is output from an address register and, therefore, the contents of the Program Counter are a "don't care." As the instructions continue, the Program Counter will be incremented up to or jumped to a value of $00F1_h$. The Opcode in the memory will be a long jump command, LJMP, which requires both the high and low address values to the output over the next two increments of the Program Counter. The first address will be a PC counter value of $00F2_h$ at the value of $FE_h$, and the next Program Counter increment of $00F3_h$ will result in an Operand of $FE_h$ being output. These two Operands are assembled as the high and low portions of the memory address and placed into the Program Register as an address $FEFE_h$. This constitutes a new Program Counter value which is then the subject of some command in the memory, a PUSH command in this example, although it could be any type of command, the result of the overall LJMP operation being to increment the Program Counter the value $FEFE_h$ to execute this command.

To illustrate the operation wherein a data move command is allowed within the restricted space, a third section of the code is illustrated. This is initiated at a program counter value of $FEFE_h$ as a MOVEC command. This is operable to, on the next two increments of the program counter to $FEFF_h$ and $FF00_h$, respectively, to output the two operands $FF_h$ and $FF_h$. This results in an address value of $FFFF_h$ being placed onto the address bus to extract data from that location in the restricted space, wherein the boundary between the restricted space and the user space is the address $F000_h$. The system will examine the fact that the PC value on the previous operand was within the restricted space, but that it was an allowed operation, since the instruction originated within the restricted space due to the fact that the program counter exists in the restricted space.

In a fourth section of the code, originating with a MOVEC command at an address of $00FE_h$ Program Counter value, an address attempt is made to the address location $FFFF_h$. If the limit between the restricted and user space is an address location of $F000_h$, then this would indicate that a command originating in the user location $00FE_h$ was trying to attempt to place an address on the address bus that was in the restricted area, i.e., attempting to extract data therefrom. It can be seen by comparison of the last two sections of the code, that an instruction originating in the restricted space accessing information in the restricted space (or even in the user space) is allowed, wherein access to information in the restricted space in response to an instruction from the user space is not allowed.

In the operation described in Table 1, a decision would be made at the point that the commands in the memory would result in an address being placed onto the address bus. It is at this point in time that the system examines the location within the memory of the Program Counter, and then also looks at the address to determine whether the address is seeking to address information within the user space or the restricted space. As described hereinabove and as will be further described hereinbelow in more detail, if the Program Counter is in user space, addressing information in restricted space for the purpose of outputting this information or examining the contents thereof will be prohibited. Alternatively, if the Program Counter is within the restricted space, i.e., executing instructions of a proprietary nature to the chip vendor, then addressing within the restricted space or the user space will be permitted.

Figure 6:
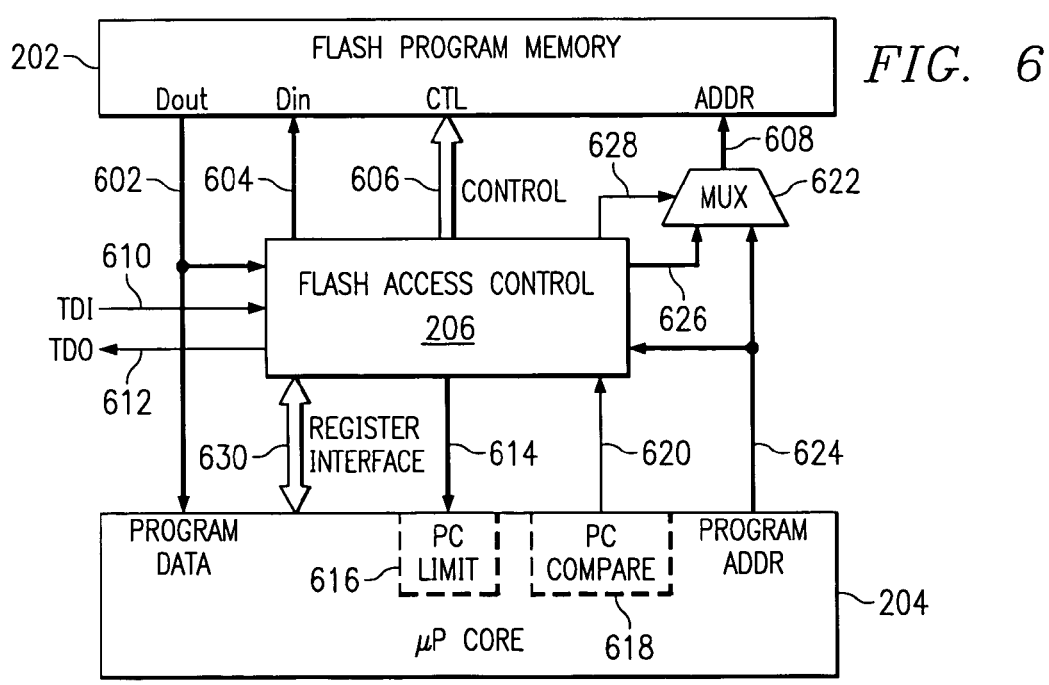
FIG. 6 illustrates a more detailed block diagram of a microprocessor core and memory with the protective logic interface.

Referring now to FIG. 6, there is illustrated a more detailed block diagram of the embodiment of FIG. 2, wherein like numerals refer to like parts in the various figures. The memory 202 is realized with a flash memory, which has a data output port, Dout, interfaced with data output bus 602 and a data input port, Din, interfaced with a data input bus 604. There is also provided a control input CTL, which receives controls from a control bus 606. The address is received on an address input via an address bus 608. The control device 206 is comprised of a flash access control which is operable to interface with a TDI input bus 610, a serial bus, and provide data output on a TDO serial output bus 612. The control 206 also is interfaced with the data bus 602 such that the output by the memory 202 can be received thereby.

The control device 206 is operable to store the limit information and provide that on a bus 614 to the microprocessor core 204 as the Program Counter limit, represented by a phantom block 616. Internal to the microprocessor core 204, in one embodiment, the comparison operation compares the actual value of the Program Counter with the PC limit in phantom block 616. This is output by an phantom block 618 which is labeled "PC Compare." This is output as a signal on a signal line 620 to the control block 206.

The control block 206 is operable to interface with, and include as part thereof, an address modifying the circuit, which is comprised in this example of multiplexer 622. The multiplexer 622 is operable to receive a portion of the address on an address bus 624, which address is also input to the control block 206, this operation described in more detail hereinbelow. This portion of the address can be modified and output to the multiplexer on a bus 626. The multiplexer 622 is controlled by a control line 628 such that the multiplexer can output the full address on bus 624 or a modified address on a bus 626. This modified address basically is operable to inhibit address input to the memory 202 when it is determined that this address is the result of a program instruction that is attempting to download or move data from the restricted portion of the memory space when the instruction code is derived from the user portion of the memory space. During operation of the memory 202, when program instructions are extracted from the memory 202 in response to a Program Counter value as an address being placed on the address bus 624, then program data will be output on the output bus 602 into a program data input on microprocessor 4204 via the data bus 602. Further, there is provided a register interface 630 between the control block 206 and the microprocessor core 204. This is a flash access control function provided by the control block 206 and is generally a conventional access to a flash memory. Serial data can be input to the flash memory via the input bus 610 and data read therefrom for the purpose of programming the memory initially and for programming instruction registers in the control block 206, this being a configuration operation—a conventional operation.

Figure 7:
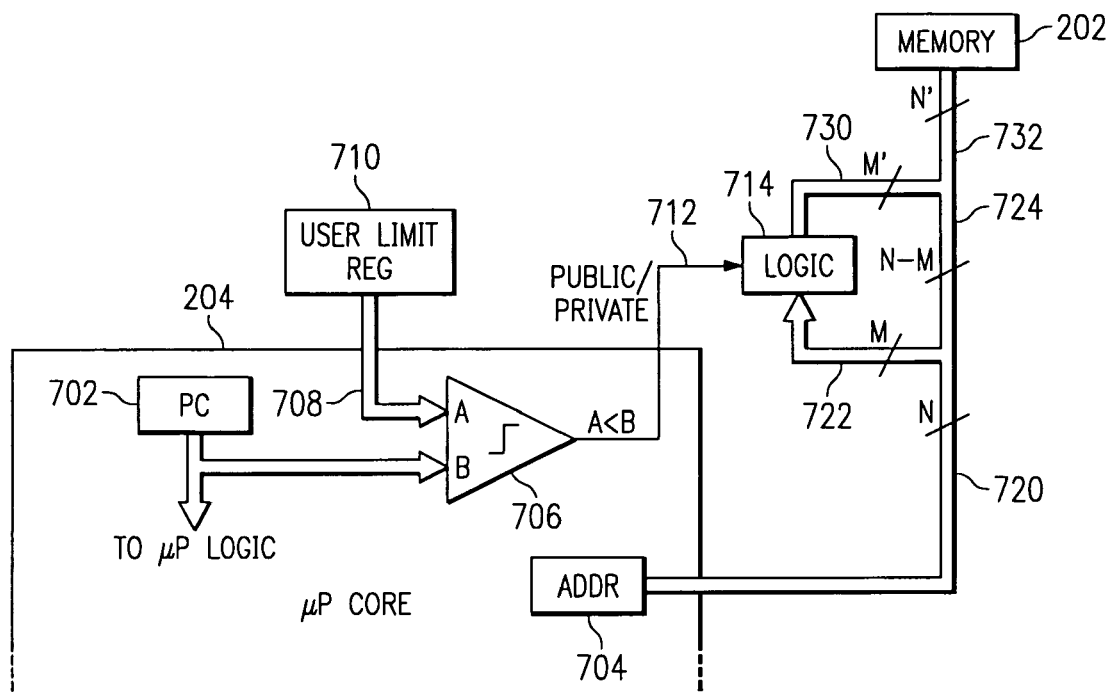
FIG. 7 illustrates a detailed block diagram of one aspect of the protective logic.

Referring now to FIG. 7, there is illustrated a detailed block diagram of one embodiment for restricting access. The microprocessor core 204 has contained therein, in a simplified illustration, a Program Counter 702 and an address register 704. The Program Counter 702 is operable to output a count value for programming instructions that will be provided it to the microprocessor logic and also provided to a comparator 706. The comparator 706 is also operable to interface through a bus 708 to a user limit register 710, this typically in the control block 206. However, this could be a limit that could be hard wired into the microprocessor core 204 or in a completely separate register in the core 204. This could even be a register within the flash memory 202 that is accessible by a certain sequence of program instructions. In any event, once loaded, this limit is unalterable by the user and, in some situations, by the actual vendor themselves.

The comparator 706 is operable to compare the value of the Program Counter with the value in the user limit register. In this manner, the comparator will provide an output on a signal line 712 which will indicate whether the Program Counter is in the restricted or in the user space with a public/private signal. This signal line 712 is input to logic block 714.

The address register 704 in the microprocessor 204 is output on an address bus 720, which has a width of N. This bus has a portion of the bits thereof extracted therefrom, there being M bits extracted therefrom on a bus 722. Therefore, the bus 720 is divided into a bus 722 with M bus lines and a bus 724 with N–M bus lines. The bus 722 is input to a logic block 714, this typically representing the upper block of memory. If there is no inhibit operation on the memory 202 to be performed due to an attempt to access data in the restricted space while operating the program in the user space, then the logic 714 will pass the received bits on the bus 722 out onto a bus 730 to be combined with the bus 724 on a bus 732. The bus 730 provides the bits M' wherein the bus 732 provides bits N'. This represents a situation wherein the bus may actually be modified by having the upper block altered. Typically, the upper block of memory addressing bits, the M bits, will be altered in the event of a positive decision on the signal line 712 that the Program Counter 702 is operating in the public area and the address output thereof is from the address register 704 and is addressing information in the private area. It should be understood that this example illustrates an address from the address register 704 where, in program situations, the information on the address bus 720 is from the Program Counter 702. This is not illustrated for simplicity purposes. However, the conduct of the address bus 720 is typically selected by a multiplexer (not shown) that selects either the output of the address register 704 or the output Program Counter 702.

Figure 8:
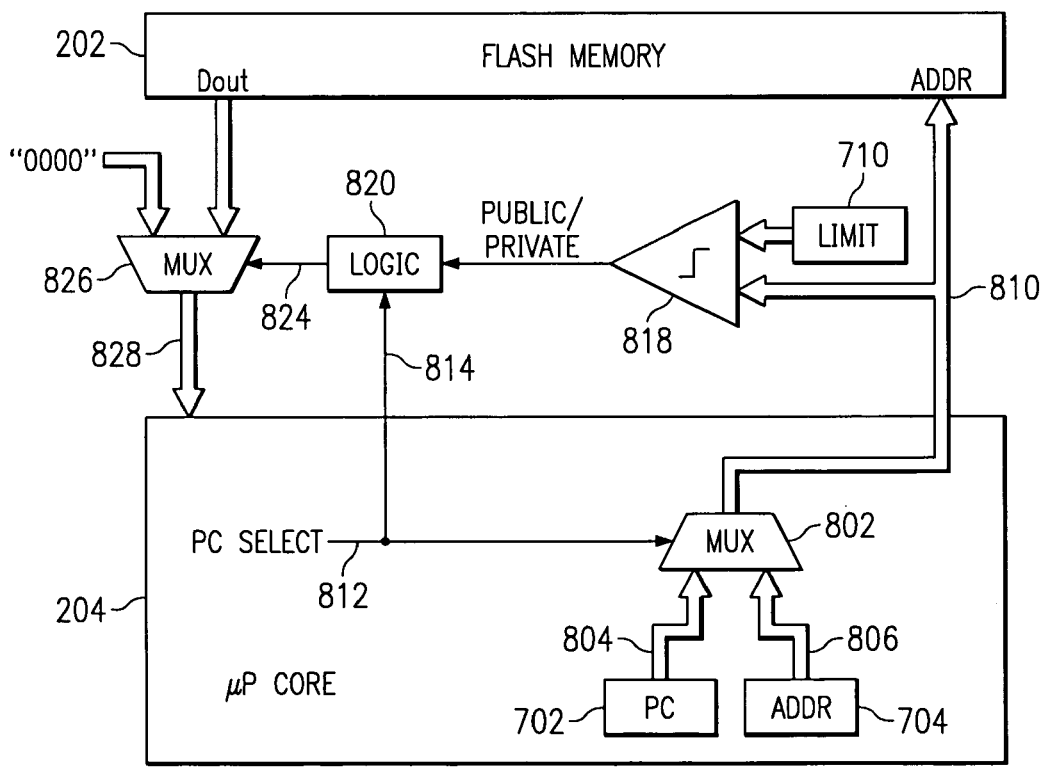
FIG. 8 illustrates a block diagram of another embodiment of the protective logic.

Referring now to FIG. 8, there is illustrated a block diagram of an alternate embodiment for inhibiting access to the memory 202 whenever an instruction executed in the user space attempts to access data in the restricted space, it being understood that a jump to a program instruction in the restricted space is allowed from the user space. In the microprocessor core 204, there is provided a multiplexer 802 that is operable to interface between the address register 704 and the Program Counter 702. The Program Counter 702 provides an output therefrom on a bus 804 to one input of the multiplexer 802, whereas the output of the address register is input to the other input of the multiplexer 802 through a second bus 806. The output of the multiplexer comprises an address bus output that is connected to an address bus 810 that is connected to the address input of the memory 202. The multiplexer 802 receives a PC select signal on an internal line 812 within the microprocessor core 204. This also is a conventional output provided by the microprocessor core 204 on a signal line 814. This line 814 indicates whether the PC register 702 is selected or the address register 704 is selected.

The contents of the address bus 810 are compared with that of the user limit register 710 with a comparator 818. This comparator 818 determines whether the address is in the public or private region of the address space, i.e., the user or restricted space, respectively. The output of this comparison operation is input to a logic block 820 which also receives the signal on the signal line 814. This logic block 820 provides an output indicating a positive decision whenever it is determined that the contents of the PC register 702 are not output on the bus 810, i.e., the contents of the address register 704 output on the address bus 810 and that the address is above the limit in the limit register 710. This positive result indicates an unauthorized attempt to access the memory 202 in the restricted space. A signal is output on a line 824 to a multiplexer 826, which multiplexer 826 will select either the data output of the memory 202 or a value of $0000_h$, a "null" value. For a positive result, the null value is selected for input to the memory 204 on the program data input via a bus 828. Logic block 820, in the alternate operational mode in the restricted space, can determine that the Program Counter value is selected for output on the bus 810 and that the Program Counter value is in the restricted address space. This indicates a program instruction that is generated by the program in the restricted space. This is latched by the logic block 820, since the comparator 818 will indicate this as being in the private region. Therefore, an indication on the line 814 that the Program Counter 702 is selected by the multiplexer 802 and that the information on the address bus 810 is in the private or restricted space is latched such that, if a subsequent instruction indicates that the contents of the address register 704 are selected, i.e., the signal line 814 indicates that the address register is selected, and that the address is attempting to address information in the memory 202, this will be allowed due to the fact that the previous program instruction was generated by program instructions in the restricted space.

A Verilog output is provided representing the operation wherein access to data in the memory with an address that is greater than the read limit resulting from the program instruction executed in the reader space:

```
wire      addr_gt_readlimit = (mem_addr > {4 ' h7, read-limit, 4 ' hf});
always @ (posedge clk or posedge rst)
    if (rst)
        user_code_executing <= 0;
    else if (pc_valid)
        user_code_executing <=¯ addr_gt_readlimit;
assign read_limit_exceeded =¯ core-reset & ¯ suspend       // uP access that is
                             ¯ mem_psenb &                 // a read cycle, by
                             user_code_executing &         // user code that is not
                             ¯ pc_valid &                  // an instruction fetch
                             addr_gt_readlimit;
*------------------------------------mem_rdata Mux--------------------------------*/
//
//      if either a S/W read access exceeds the "read_limit" or the JTAG port
//      trys to read a "read_locked" region - the security H/W will mux ZEROs
//      onto the "security_dout" bus
//
assign security_dout = read_limit_exceeded
                                      ?8 ' h00        // output all zeros
                                      : dout;         // read data from flash
```

Figure 9:
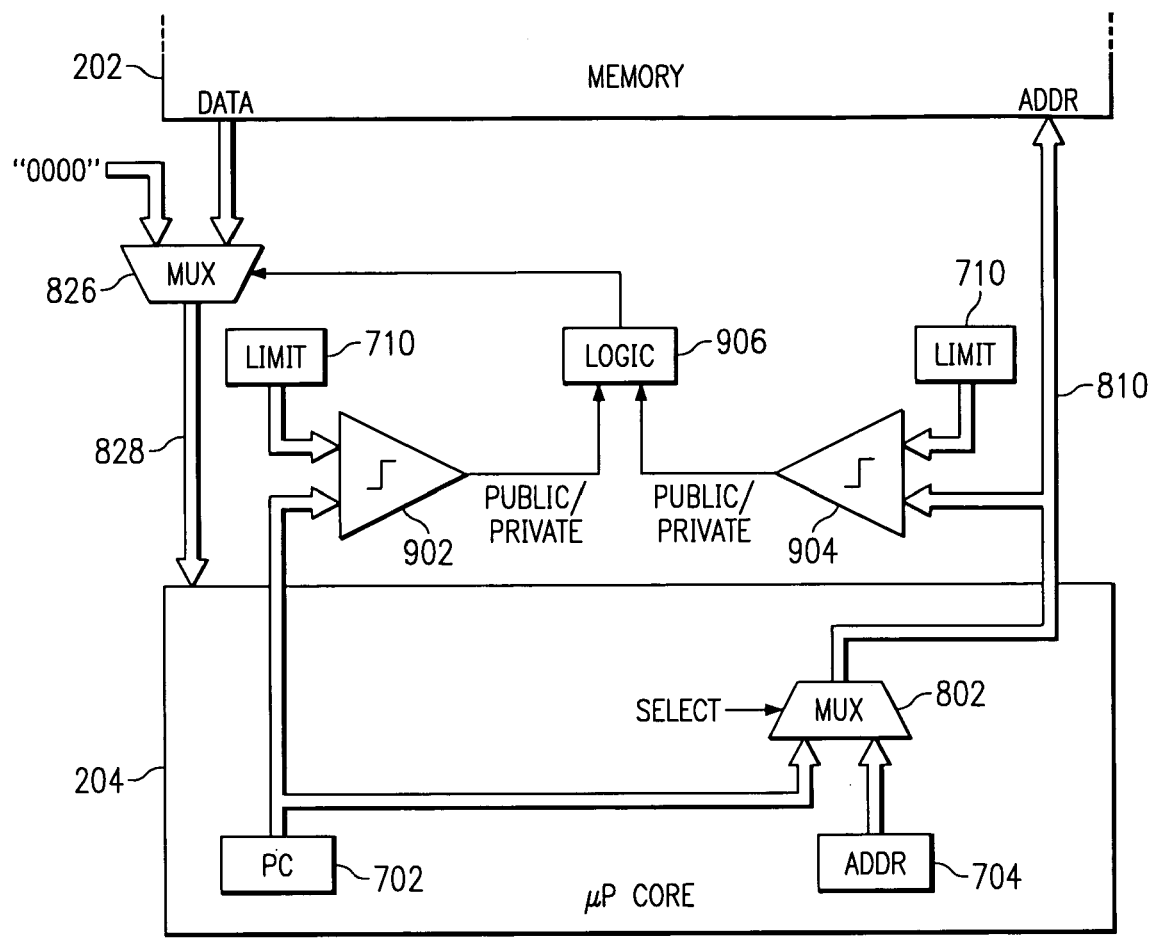
FIG. 9 illustrates another embodiment of the protective logic.

Referring now to FIG. 9, there is illustrated a block diagram of an alternate embodiment. In the embodiment of FIG. 9, the contents of the Program Counter 702 are output to a comparator 902 which compares the information thereof with the contents of the limit register 710 to determine if the Program Counter value is in a public or private region. Similarly, the contents of the address bus 810 are compared with a comparator 904 with a limit in the limit register 710. The limit register 710 is illustrated as two registers for simplicity purposes, to determine if the contents of the address register are in the public or private region. The output of both comparators 902 and 904 are input to the logic block 906. Logic block 906 determines whether the Program Counter is in the private or public area and also determines whether the information in the address bus 810 is in the public or private area. If it is determined that the Program Counter 702 is operating in the private area and that the information in the address bus 810 is operating in the private area, then the multiplexer will allow data to flow therethrough, since the logic block 906 can determine that the address is the result of a previous Program Counter instruction in the private area or restricted area. However, when it is determined that the Program Counter is in the public area, the user area, and the address is an address value from address register 704 and this is in the restricted or private area, then the logic block 906 will control the multiplexer to select the null value.

Figure 10:
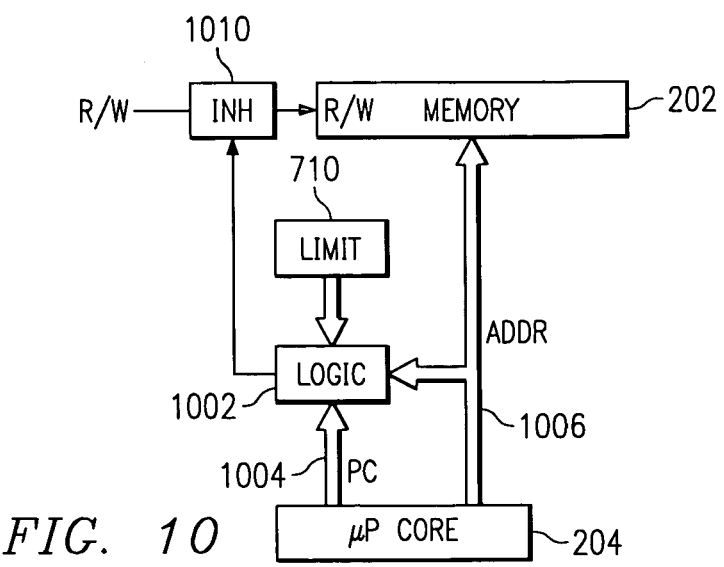
FIG. 10 illustrates an additional embodiment of the protective logic.

Referring now to FIG. 10, there is illustrated a view of an alternate embodiment for inhibiting the memory operation. In this simplified embodiment, there is provided a control block or logic block 1002 that is operable to receive the output of the Program Counter on a bus 1004 and the address bus on an address bus 1006. The logic block 1002 compares this with information in the limit register 710 to determine what type of operation is being performed, i.e., a program instruction or a memory access instruction, and where in the memory map the address resides. This was described hereinabove. In this embodiment, there is provided an inhibit circuit 1010 that is operable to inhibit a read/write operation to memory 202 in the event that the logic block 1002 makes a determination that this is a restricted operation.

Figure 11:
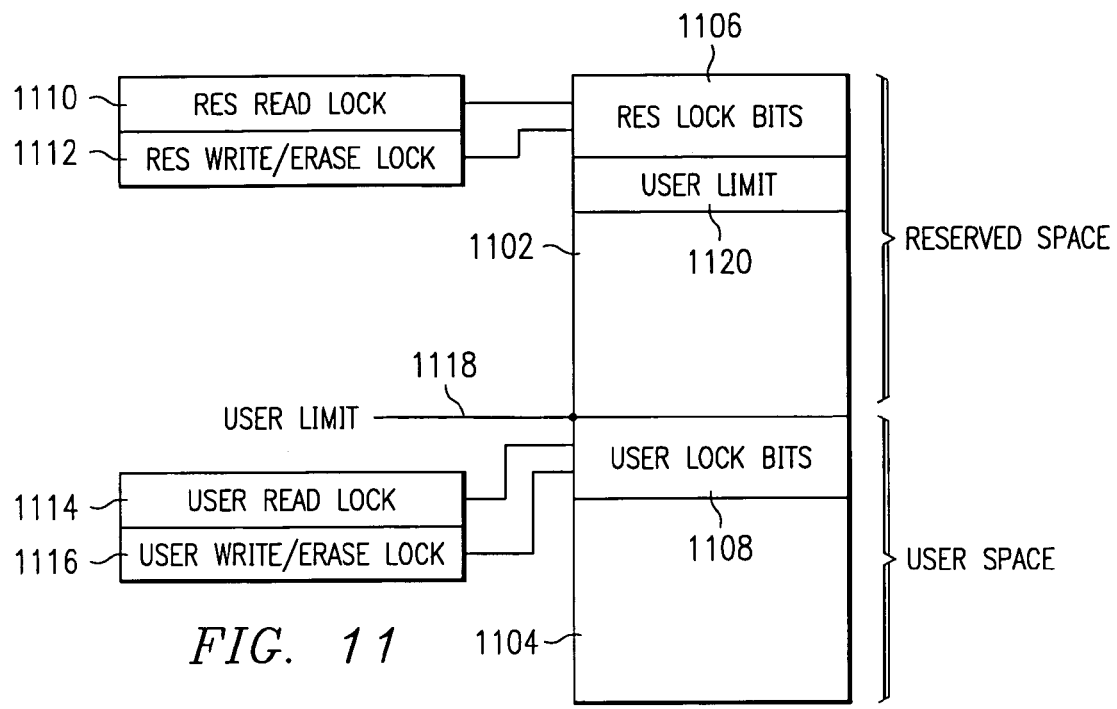
FIG. 11 illustrates a diagrammatic view of the reserve space and user space illustrating the reserved and user lock bits.

Referring now to FIG. 11, there is illustrated a diagrammatic view of the memory, which, as described hereinabove is incorporated in FLASH. As noted hereinabove, the memory is divided into a reserved space 1102 and into a user space 1104. The reserved space is, as described hereinabove, protected from reading by the user and is used primarily for executing instructions. The user space, on the other hand, is space which the user can utilize for execution of user defined functions and for reading of data therefrom or for writing of data thereto.

In addition to the above noted operations of the reserved space and the user space, there is also the provision for protecting all or a portion of the reserved space or the user space from reading or writing, after creation thereof. This utilizes lock bits which are stored in a reserve lock byte 1106 in the reserve space 1102 for locking all or a portion of the reserve space, and in a user lock byte 1108 in the user space 1104, which is associated with all or a portion of the user space 1104. The reserve lock bits in the lock byte 1106 each are associated with a page of the reserve space 1102. Once set to a logic "0," this particular page and all addressable locations therein is locked and cannot be unlocked without erasure of the page. Similarly, the user lock byte contains user lock bits each associated with a page in the user space 1104. Once the lock bit has been set to a logic "0" for that page, access thereto for reading or writing/erasure is prohibited. It should be noted that the lock bit can be associated with reading or writing/erasure. It is also noted that each of the reserve lock byte 1106 and user lock byte 1108 is comprised of two bytes, one for reading and one for writing/erasing. This is illustrated as lock byte 1110 for locking read operations in select portions of the reserve space 1102 and a lock byte 1112 for locking write/erase operations in the reserve space. A lock byte 1114 is associated with locking read operations in the user space and a lock byte 1116 is associated with locking write/erase operations in the user space.

It is noted that the user lock byte 1108 is disposed at the upper portion of the user space which upper portion is defined by the user limit 1118, this being a variable location. This value is typically stored somewhere in the reserve space, typically in the upper portion of the memory in a reserve space 1102, a known location and not variable. This is typically associated with a number of different vectors defining various operations in the user space. By reading this value from the user space, the system then knows where the user limit is and subsequently, where the user lock byte resides. The user lock byte and the reserve lock byte are always located in the upper portion of the associated space.

As will be described hereinbelow, the user space lock byte is erased by erasing one logical block of memory at a time, i.e, a page, beginning at the lower end thereof until the user lock byte 1108 is erased. To erase the reserve space lock byte, the entire memory must be erased. However, a single sector or page can be erased in either section if it is not locked.

Figure 12:
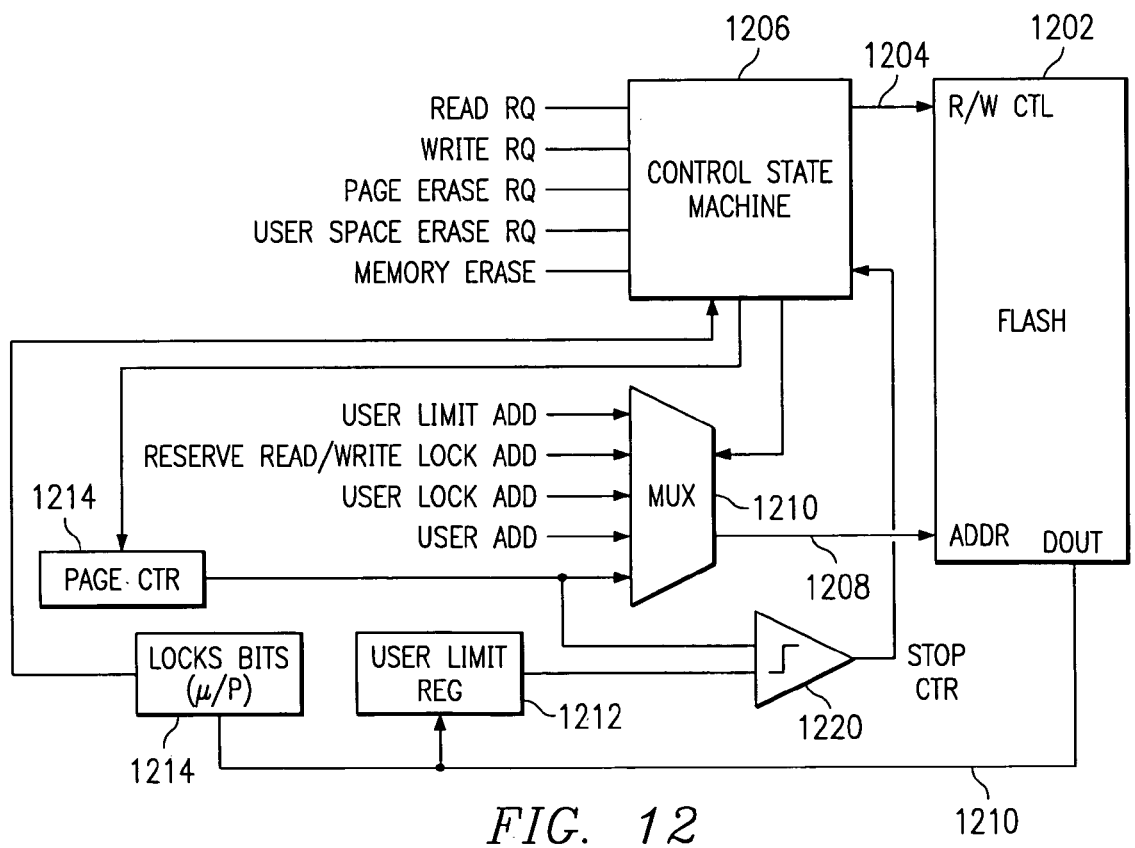
FIG. 12 illustrates a diagram of the hardware for protecting portions of the memory.

Referring now to FIG. 12, there is illustrated a diagrammatic view of the hardware for implementing the external user access protection via the lock bytes. The FLASH memory is illustrated by a memory 1202, which is operable to receive read/write control operations via a control line 1204 in the form of a bus from a control state machine 1206. Additionally, an address received from an address bus 1208 and data is output on a data bus 1210. The controls that are input into the FLASH 1202 are facilitated by external access which requires an external interface. As described hereinabove, the access is through a JTAG test port standard, which is a serial communication protocol. The access commands that are available are a READ operation which will allow a single memory byte to be read, a WRITE operation which will allow a single memory byte to be read and erase sector operation which will allow a memory sector to be defined by the memory architecture and to be erased, this the logical sector such as a page. The ability to read a byte, write a byte or erase a particular sector is a lockable function. Additionally, commands are available to allow the entire user memory space to be erased, a command to allow the entire reserve space to be erased or a command to erase the entire program memory. All of these commands can be encoded as a single byte followed by an address and data bytes, as required for a particular microprocessor architecture.

The control state machine can receive either a READ request, a WRITE request, a page erase request or a user space erase request, in addition to an entire memory erase command. In order to execute these commands, it is necessary to access the various lock bytes, the limit address and the such. A multiplexer 1210 is provided which is controlled by the control state machine 1206 to select various addresses. These addresses are the user limit address, which defines where the user lock bytes are stored, which is facilitated by accessing the memory 1202 at the upper address therein where the limit address is stored, reading this information and then storing this information in a user limit register 1212. It is noted that the location of the lock byte for the user space is hard coded as being at a predetermined address in the top page therein and, in the preferred embodiment, in the top two bytes therein. The reserve read and write/erase lock address is a value that is hard coded in the hardware and is provided as an input to the multiplexer 1210, this being the top of the memory space and a known and fixed value. The user lock address determined from the user limit address is provided in addition to a general user address, this being the address that a user inputs into the memory. In addition, the multiplexer 1210 receives the output of a page counter 1214 which counts pages in the user space as will be described hereinbelow.

When the lock bits are read for either the user space or the reserved space, they are stored in a register 1214 for use by the control state machine. Additionally, the user limit register 1212 is loaded initially by the control state machine by reading the upper addressable location in the memory. In order to read the lock bits, the lock bits for the reserve space are read by selecting the reserve read/write lock address with the multiplexer 1210 and, for the user space, selecting the user limit address.

When erasing the user lock byte in the user space, it is necessary to erase the lower pages of memory first, since the memory is organized in logical blocks of 512 bytes. These logical pages must be erased one at a time and, as such, one cannot erase the memory location containing the user lock byte until all lower pages or blocks have been erased. Therefore, the counter is utilized to begin erasing the lower page first up to the upper page. A comparator 1220 is provided for comparing the user limit address value with the value in the page counter, this constituting the upper address in the page. When the page counter exceeds this value, then the page counter is stopped, this being a control signal output by the comparator 1220.

Figure 13:
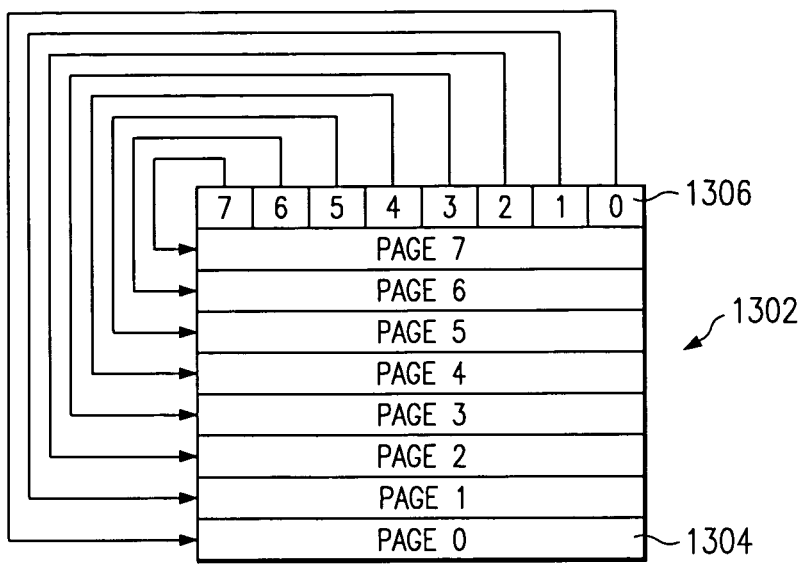
FIG. 13 illustrates a diagrammatic view of the association of the lock bits with various pages in the associated memory.

Referring now to FIG. 13, there is illustrated a diagrammatic view of how each of the lock bytes and the bits associated therewith are associated with various logical pages or sectors in the memory. A section of the memory, being the reserved or the user section, is illustrated as a section 1302. The section 1302 is divided into eight pages 1304 labeled Page 0–Page 7. A lock byte 1306 is provided which has seven bits. It should be understood that there will be two lock bytes, one for READ and one for WRITE/ERASE, although only one is illustrated. A lock byte has eight bits associated therewith. Each bit is associated with one of the pages 1304 of the memory. However, although being illustrated as eight bits in eight sectors, there may in fact be less sectors. There may in fact be one of the lock bits that is associated with a different function and not necessarily with locking a particular sector of memory. As such, it is possible for only portions of the memory to be locked as opposed to the entire memory.

Figure 14:
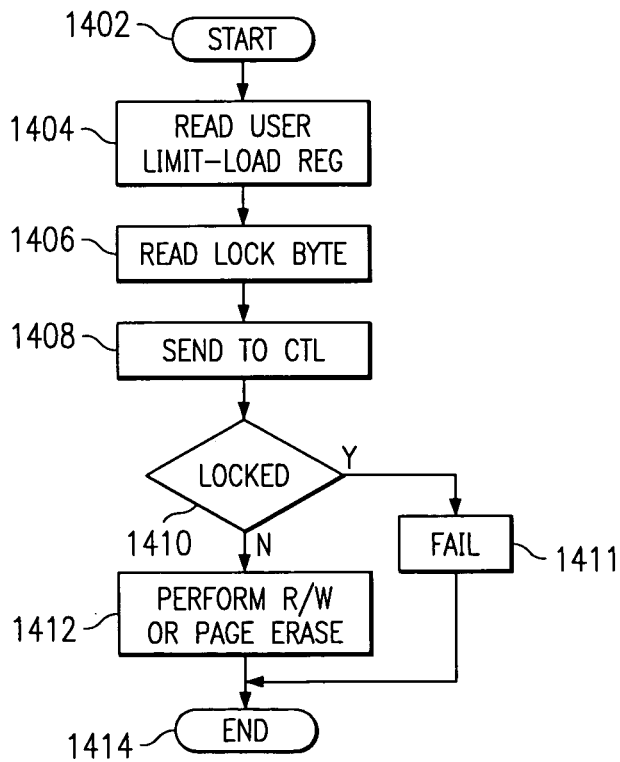
FIG. 14 illustrates a flow chart depicting the operation of reading or writing to potentially protected portions of the memory.

Referring now to FIG. 14, there is illustrated a flow chart depicting the operation of reading or writing to a particular memory location or erasing a page. The program is initiated at a block 1402 and then proceeds to a block 1404 to read the user limit and then load the register 1212. The control state machine 1206 then reads the appropriate lock byte 1106 or 1108, depending upon whether the addressed location is in the reserve space 1102 or the user space 1104, respectively, it being understood that this comprises both of the lock bytes 1114 and 1116 for the user space 1104 and both of the lock bytes 1110 and 1112 for the reserve space 1102, this indicated by a function block 1406, it being understood that only a single lock byte will be read depending upon whether it is a READ or a WRITE operation. This information is then sent to the control state machine 1206, as indicated by block 1408. A decision is then made at a decision block 1410 to determine if the particular address defined by the user address is locked. If so, then the operation will fail, as indicated by fail block 1411, and user access will be inhibited for a READ, a WRITE or page erase depending upon the function locked. However, if it is not locked, then the particular READ or WRITE operation or page erase operation can be performed as indicated by function block 1412. The program then flows to a function block 1414.

Figure 15:
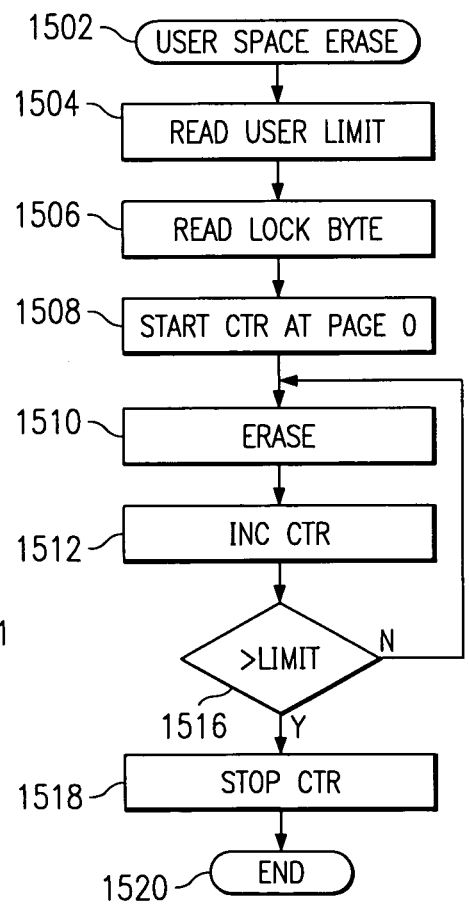
FIG. 15 illustrates a flow chart depicting erasing all or a section of the user space.

Referring now to FIG. 15, there is illustrated a flow chart depicting the operation of erasing the user space. Whenever the entire user space is to be erased, as described hereinabove, the bottom pages must be erased first. The program is initiated at a block 1502 and then proceeds to a block 1504 to read the user limit and then to block 1506 to read the lock byte at the user limit. The program then initiates a start counter as indicated by a block 1508 at Page 0. The program then flows to function block 1510 to erase this block of memory and into a block 1512 to increment the page counter. A decision is then made at a decision block 1516 as to whether the user limit has been exceeded, i.e., the address is in the reserve space. If not, then this particular page is erased by flowing back to the input of function block 1510. However, once the counter has been incremented past the user limit, then the program will flow from the decision block 1516 along the "Y" path to a function block 1518 to stop the counter and then to function block 1520 to an END block. As noted, the entire user space can be erased or just one sector in the user space. This selective access to portions of a space with a single lock byte provides an increased versatility to the system.

Although the preferred embodiment has been described in detail, it should be understood that various changes, substitutions and alterations can be made therein without departing from the spirit and scope of the invention as defined by the appended claims.

What is claimed is:

1. A method for protecting a memory space from external access, the memory space having a plurality of logical portions, comprising the steps of:

storing in a location in the memory space on one of the logical portions thereof a plurality of lock bits, each of the lock bits associated with a separate one of the logical portions of the memory space, including the logical portions in which the lock bits are stored, and determinative as to the access thereof for a predetermined memory access operation thereon, there being at least two different memory access operations;

detecting a request for access to a desired location in one of the logical portions in the memory space for operating thereon;

comparing the requested predetermined memory access operation with the one of the lock bits associated with the one of the logical portions to which the request for access is directed and determining if access is allowed thereto for the requested predetermined memory access operation of the at least two different memory access operations; and performing the requested predetermined memory access operation of the at least two different memory access operations on the desired location in the memory space; otherwise denying said access;

wherein the predetermined memory access operation includes an erase of the associated logical portion for an addressable location therein, and wherein location the plurality of lock bits comprises storing in a variable location in the memory space the plurality of lock bits and storing the location of the lock bits in a known location in the memory space, such that in the step of comparing, the location of the lock bits is first read from the known location in the memory space and then this read location is utilized to read the lock bits from the memory space.

2. The method of claim 1, wherein the predetermined memory access operation is a read of an addressable location in the associated logical portion.

3. The method of claim 1, wherein the predetermined memory access operation is a write of an addressable location in the associated logical portion.

4. The method of claim 1, wherein the predetermined memory access operation is an erase of the lock bits.

5. The method of claim 4, wherein the predetermined memory access operation of erasing the lock bits requires that each of the lower logical portions of the memory space, relative to the variable location, having a relatively lower logical memory address and not containing lock bits be erased before a top most portion of memory space having a relatively higher logical address than the lower logical portions is erased, which top most portion of the memory space contains the lock bits.

6. The method of claim 1, wherein all of the lock bits are stored in a single one of the logical portions.

7. A method for protecting a memory space from an external access, the memory having a plurality of logical portions, comprising the steps of:

storing in a location in the memory space on one of the logical portions thereof a plurality of lock bits, each of the lock bits associated with a separate one of the logical portions of the memory space, including the logical portion in which the lock bits are stored, and determinative as to the access thereof for a predetermined memory access operation thereon;

detecting a request for access to a desired location in one of the logical portions in the memory space for operating thereon;

comparing the requested predetermined memory access operation with the one of the lock bits associated with the one of the logical portions to which the request for access is directed and determining if access is allowed thereto for the requested predetermined memory access operation; and performing the requested predetermined memory access operation on the desired location in the memory space; otherwise denying said access;

wherein the predetermined memory access operation includes an erase of the associated logical portion for an addressable location therein; and wherein the step of storing in a location the plurality of lock bits comprises storing in a variable location in the memory space the plurality of lock bits and storing the location of the lock bits in a known location in the memory space, such that in the step of comparing, the location of the lock bits is first read from the known location in the memory space and then this read location is utilized to read the lock bits from the memory space.

8. The method of claim 1, wherein the predetermined memory access operation is a read of an addressable location in the associated logical portion.

9. The method of claim 1, wherein the predetermined memory access operation is a write of an addressable location in the associated logical portion.

10. The method of claim 7, wherein the predetermined memory access operation is an erase of the lock bits.

11. The method of claim 10, wherein the predetermined memory access operation of erasing the lock bits requires that each of the lower logical portions of the memory space relative to the variable location having a relatively lower logical memory address and not containing lock bits be erased before a top most portion of memory space having a relatively higher logical address than the lower logical portions is erased, which top most portion of the memory space contains the lock bits.

12. The method of claim 7, wherein all of the lock bits are stored in a single one of the logical portions.

* * * * *